(12) United States Patent  
Hattori et al.

(10) Patent No.: US 7,717,781 B2  
(45) Date of Patent: May 18, 2010

(54) APPARATUS AND METHOD FOR CONTROLLING CLEARING IN A FALLING OBJECT GAME WITH A SEQUENCE BAR

(75) Inventors: Ryuichi Hattori, Tokyo (JP); Osamu Kodera, Yokohama (JP); Katsumi Yokota, Tokyo (JP)

(73) Assignees: Bandai Co., Ltd., Taito-Ku, Tokyo (JP); Q Entertainment, Inc., Meguro-Ku, Tokyo (JP); Namco Bandai Games, Inc., Ota-Ku, Tokyo (JP)

( * ) Notice: Subject to any disclaimer, the term of this patent is extended or adjusted under 35 U.S.C. 154(b) by 812 days.

(21) Appl. No.: 11/138,866

(22) Filed: May 27, 2005

(65) Prior Publication Data

US 2005/0266908 A1  Dec. 1, 2005

(30) Foreign Application Priority Data

May 28, 2004  (JP)  ............................. 2004-159811

(51) Int. Cl.  
*A63F 13/00* (2006.01)
(52) U.S. Cl. .................. 463/9; 463/30; 463/31
(58) Field of Classification Search .......... 463/19, 463/20  
See application file for complete search history.

(56) References Cited

FOREIGN PATENT DOCUMENTS

JP  3019970  1/2000

OTHER PUBLICATIONS

Wikipedia. 'Tetris Plus' <URL: http://en.wikipedia.org/wiki/Tetris_Plus>.*  
Argonaut. 'Argonaut's Tetris Stategy Guide' <URL: http://www.gamefaqs.com/portable/gameboy/file/198944/3112>.*  
"Nintendo Official Guidebook, Korokoro Puzzle Happy Panecchu", Shogakukan Inc., Apr. 20, 2002, pp. 2, 3, 6, and 10-22, vol. 1, (With English Translation, pp. 1-33).  
Japanese Office Action dated Oct. 17, 2005.

* cited by examiner

*Primary Examiner*—John M Hotaling, II  
(74) *Attorney, Agent, or Firm*—Buchanan Ingersoll & Rooney PC

(57) ABSTRACT

A computer game which makes the player operate a falling object that falls in a predetermined display area, and clears the falling object and falling stop objects by combining the falling object and falling stop objects under a predetermined condition. If falling stop objects including blocks that stop falling include a group of blocks which meet a predetermined clear condition, the group of blocks are registered as blocks to be cleared, and the control waits for a clear waiting state. Even in this waiting state, the next falling object begins to fall. After that, when a sequence bar (701) which moves vertically or horizontally in synchronism with a music output along with the progress of the game has passed the blocks to be cleared, these blocks are cleared.

16 Claims, 17 Drawing Sheets

COMPLETION OF DOG PATTERN

OPERATION OF FALLING OBJECT

SETTLEMENT OF CLEAR BLOCKS
(CENTRAL FOUR BLOCKS)

APPEARANCE OF SEQUENCE BAR

CLEAR BLOCKS TO BE CLEARED

COMPLETION OF DOG PATTERN

APPARATUS AND METHOD FOR CONTROLLING CLEARING IN A FALLING OBJECT GAME WITH A SEQUENCE BAR

FIELD OF THE INVENTION

The present invention relates to a game which operates falling objects, and clears objects by combining the falling object and falling stop objects under a predetermined condition and, more particularly, to a technique for controlling a clear timing and clear conditions of the combined objects.

BACKGROUND OF INVENTION

Conventionally, games in a category so called "falling block games" such as Tetris, Columns, and the like are available in the game market.

For example, in Tetris, when one row is fully filled with blocks, it is indicated that blocks to be cleared are settled, and the blocks arranged in one row are then immediately cleared. On the other hand, in Columns, when three or more blocks of the same color run on in the vertical, horizontal, or oblique direction, it is indicated that blocks to be cleared are settled, and the blocks are then immediately cleared.

Also, there has been proposed a game in which the user operates drug capsules of two colors which are falling automatically to fall onto viruses arranged in advance, and when three or more virus and drug capsules with the same color run on vertically or horizontally, it is displayed that blocks to be cleared are settled, and they are cleared immediately (Japanese Patent No. 3019970).

However, the conventional "falling block games" are lacking in thrills, since blocks to be cleared are immediately cleared after it is indicated that they are settled. Especially, since no next block begins to fall until blocks to be cleared are settled and cleared, if blocks line up, the player feels easy, and is deprived of a chance of enjoying further thrills.

Also, a clear condition is simple, i.e., a predetermined number or more of objects which run on vertically, horizontally, or obliquely are merely cleared, and the game player gets tired soon. That is, since the clear condition remains fixed from the beginning to the end of the game, the player is not surprised by the clear condition.

SUMMARY OF THE INVENTION

It is, therefore, an object of the present invention to solve at least one of the above and other problems. Note that other problems will be understood throughout the specification.

In order to solve the above problems, according to the present invention, in a game which makes a player operate a falling object that falls in a predetermined display area, and clears the falling object and falling stop objects by combining the falling object and falling stop objects under a predetermined condition, it is checked if a falling stop object which stops falling and other falling stop objects arranged in advance around that falling stop object satisfy a predetermined clear condition. If the clear condition is satisfied (i.e., objects to be cleared are settled), a portion that satisfies the clear condition of the falling stop objects (including both the new falling stop object and existing falling stop objects) is registered as an object to be cleared. In synchronism with a predetermined part of a music which is output along with the progress of the game, the falling stop objects registered as the object to be cleared are cleared. Alternatively, when a moving object which is movable in the predetermined display area along with the progress of the game has passed the falling stop objects registered as the object to be cleared, these falling stop objects are cleared. Alternatively, when a sequence bar which moves vertically or horizontally in the display area in synchronism with a music which is output along with the progress of the game has passed a portion of the falling stop objects, that portion is cleared.

Note that the clear condition is satisfied not only when a predetermined number or more of small blocks that form portions of falling stop objects run on vertically, horizontally, or obliquely, but also when a predetermined pattern such as "dog", "X mark", or the like is formed by the portions. Note that "dog", "X mark", or the like is merely an example to demonstrate that the clear condition of the present invention is different from the conventional one.

When formation of such predetermined pattern is used as the clear condition, a hint of the pattern may be displayed.

According to the present invention, since objects are not immediately cleared even when the clear condition is satisfied but are cleared after a sequence bar has passed, the player can be thrilled more than the conventional games.

If objects are cleared when a predetermined pattern such as "dog", "X mark", or the like is formed, since elaborate clear conditions can be set compared to the conventional games, the player can experience the difficulty level and exhilaration of the game unlike in the conventional games.

Since a hint of the pattern is displayed, it can help the player understand the clear condition.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT(S)

An embodiment that help understand the generic concept, concept between generic and subordinate concepts, and subordinate concept of the present invention will be described hereinafter. The appended claims do not always describe all concepts included in the following embodiment. However, since such concepts are not excluded on purpose from the technical scope of the patent invention but are equivalent to the patent invention, they are not described in the appended claims in some cases.

First Embodiment

Figure 1:
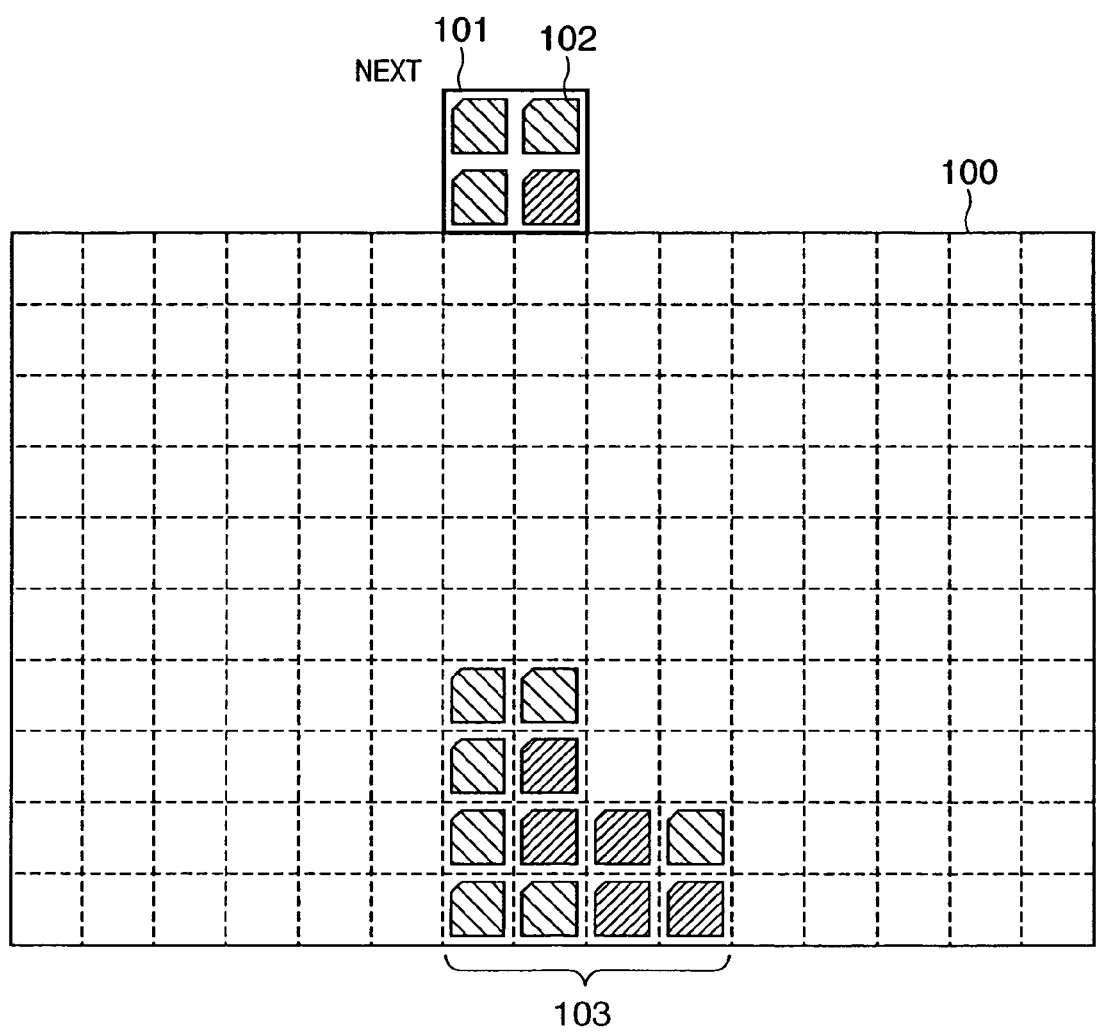
FIG. 1 shows an example of a display window of a game according to an embodiment of the present invention.

FIG. 1 shows an example of a display window of a game according to this embodiment. An overview of the game according to this embodiment will be described first using FIG. 1.

The game according to this embodiment belongs to a category called "falling block games" in the game market. The player operates falling objects 102 which are falling in a field 100 as a predetermined display area, and clears the falling object 102 and falling stop objects 103 by combining them in a predetermined condition (strictly speaking, after the falling object 102 is turned to a falling stop object 103, the clear condition is checked, and only a portion that satisfies the clear condition is cleared).

Upon clearing the falling object 102 and falling stop objects 103, all of these objects are not always cleared, but some small blocks which form the falling object 102 and falling stop objects 103 are often cleared. In this example, the falling object 102 which appears next is displayed in a next box 101. In this example, the falling object 102 is formed of four small blocks. However, the present invention is not limited to this, and the falling object need only be formed of one or more blocks. Also, as the types of falling objects 102, the outer shapes of falling objects 102 need not always be uniform. For example, a falling object 102 including one block may be provided, and a falling object 102 including two blocks may be provided.

The falling stop objects 103 are piled up falling objects 102 which are not cleared after they land on the bottom of the field 100. Note that falling stop objects 103 may be displayed as falling stop objects from the beginning of the game independently of the falling object 102. Note that some small blocks which form the falling stop objects 103 may be cleared, and the remaining small blocks may move downward upon clearing.

In this example, the field 100 is defined by 15 grids in the horizontal direction, and 10 grids in the vertical direction, and can accommodate one small block per grid. When the falling object 102 is moved, move control is executed for respective grids.

Figure 2:
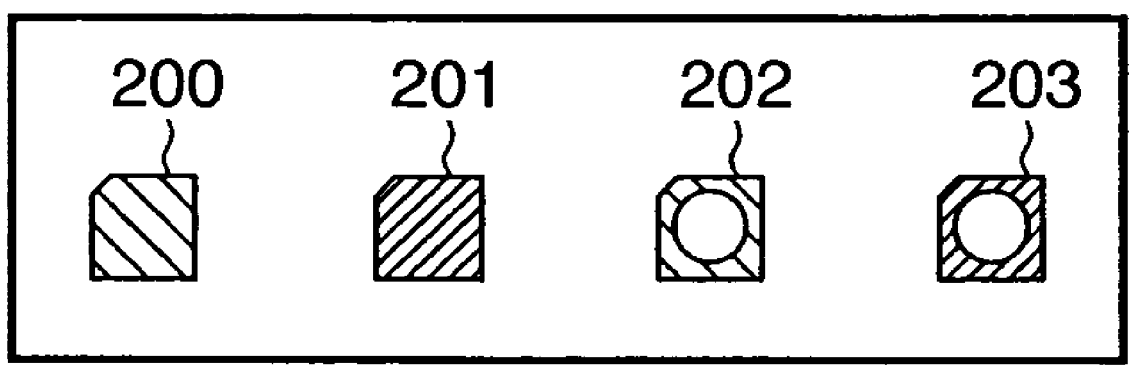
FIG. 2 shows an example of small blocks according to the embodiment of the present invention.

FIG. 2 shows an example of small blocks according to this embodiment. This example illustrates a white block 200, red block 201, white magic block 202, and red magic block 203. The white and red blocks 200 and 201 are normal small blocks having a high frequency of occurrence. On the other hand, the white and red magic blocks 202 and 203 have a relatively lower frequency of occurrence than the normal blocks, but have special meanings. For example, if a magic block is included in a plurality of blocks of the same color, which satisfy the clear condition, another block of the same color, which neighbors the plurality of blocks of the same color, is controlled to be simultaneously cleared. Note that a neighboring pattern is a vertically or horizontally neighboring pattern except for an oblique neighboring pattern. If still another block which neighbors the neighboring block has the same color, it also becomes an object to be cleared.

Figure 3:
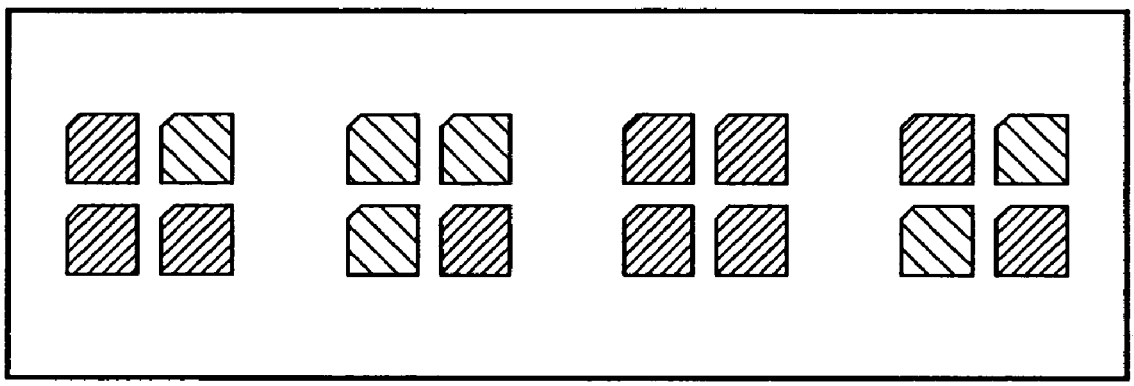
FIG. 3 shows an example of falling objects according to the embodiment of the present invention.

FIG. 3 shows an example of falling objects according to this embodiment. FIG. 3 exemplifies four different blocks having different combinations of internal small blocks. There are 16 different types of falling objects as combinations of only white and red blocks 200 and 201 in practice. Note that there can exist 256 different types of falling objects including two different types magic blocks.

Figure 4:
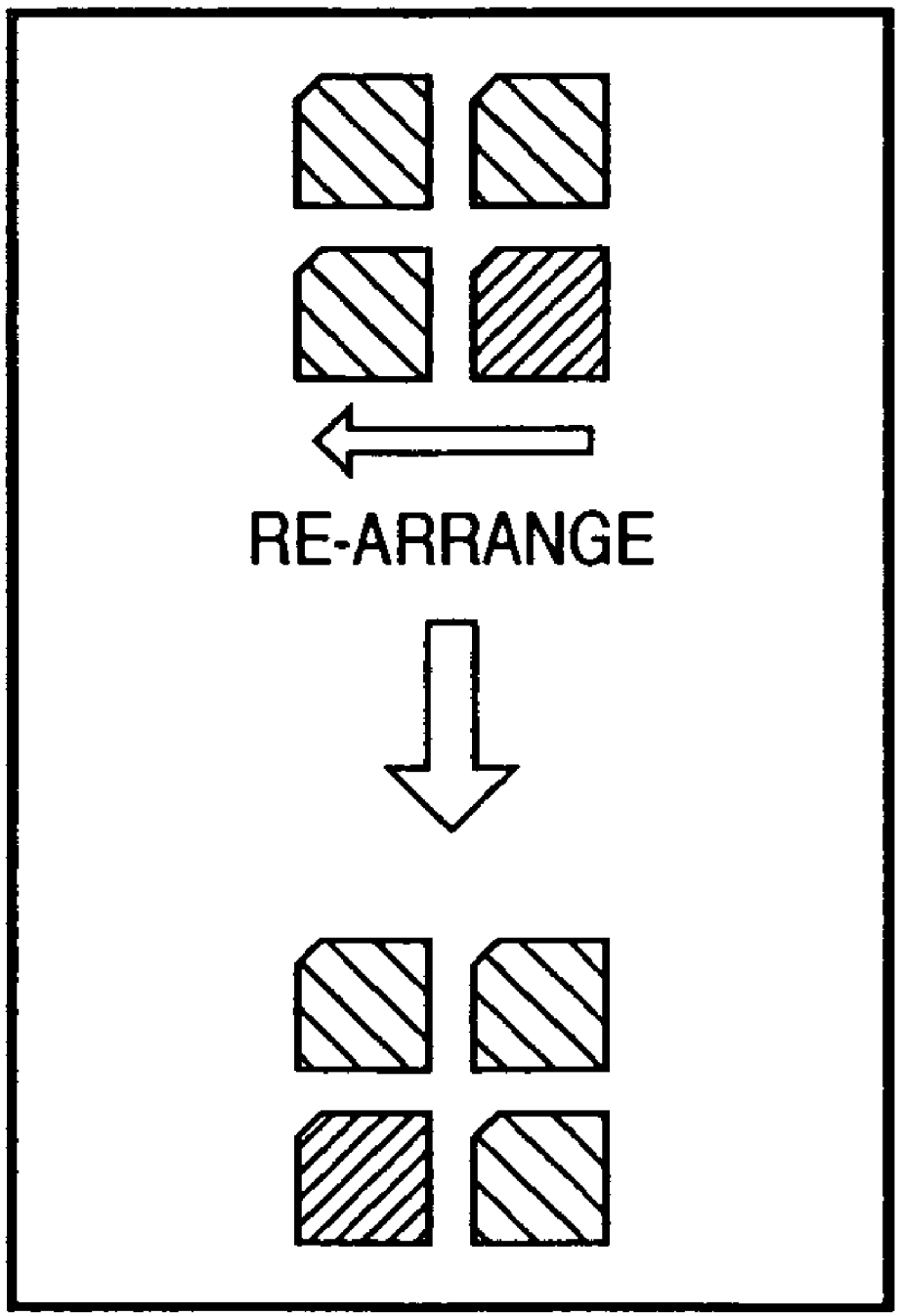
FIG. 4 shows an operation example of a falling object according to the embodiment of the present invention.

FIG. 4 shows an operation example of a falling object according to this embodiment. When a falling object displayed at the falling start position begins to fall, it moves in the right, lower, or left direction in accordance with an operation input from an operation unit of the game apparatus. Likewise, internal small blocks which form the falling object can be re arranged in accordance with an operation input from the operation unit of the game apparatus. Note that re arrangement is executed without rotating the falling object itself. Of course, the falling object itself may be rotated.

Figure 5:
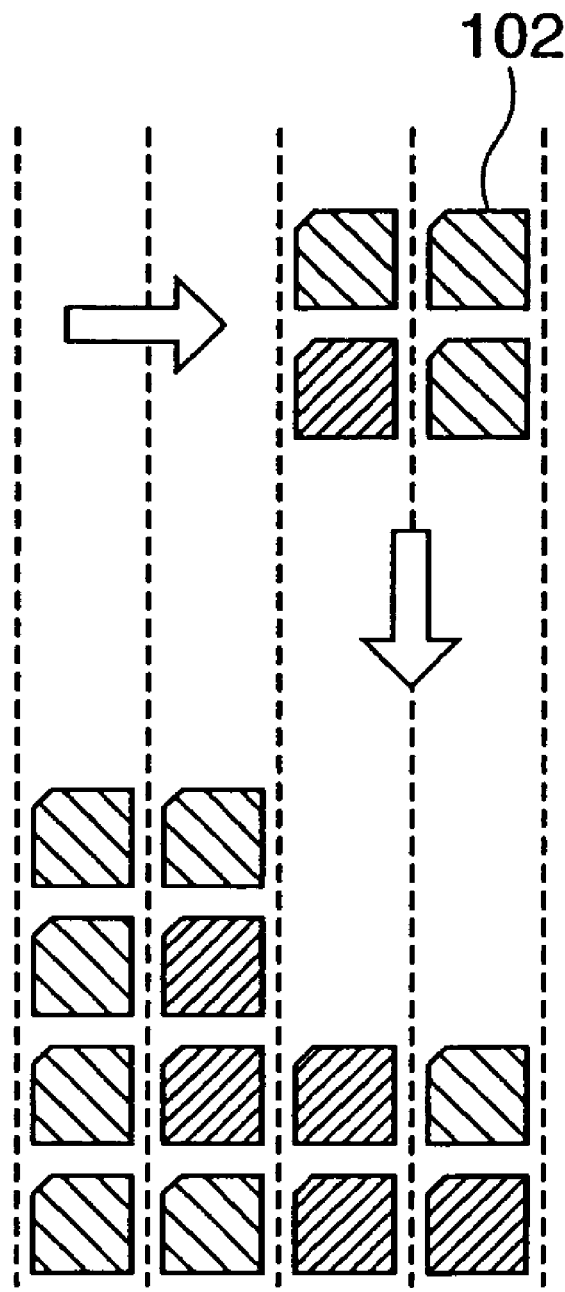
FIG. 5 shows a clear example of a falling object and semi fixed objects according to the embodiment of the present invention.

FIGS. 5 to 8 show a clear example of a falling object and falling stop objects according to this embodiment. FIG. 5 illustrates that the falling object 102 in FIG. 1 undergoes a re arrange operation of internal small blocks once, and is moved by two grids to the right. After that, the falling object 102 lands on the falling stop objects 103. The falling object 102 is controlled to automatically fall along with an elapse of time, but it may be forcibly moved downward by an input from the operation unit.

Figure 6:
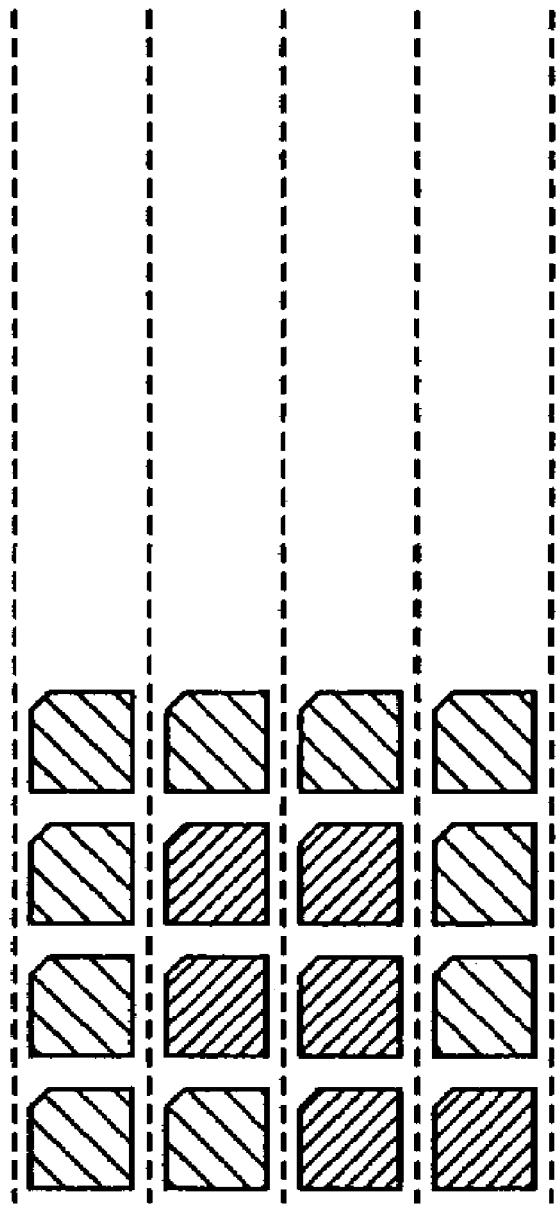
FIG. 6 shows a clear example of a falling object and semi fixed objects according to the embodiment of the present invention.

FIG. 6 illustrates that the falling object 102 lands on the falling stop objects 103, and four small blocks of the same color form a square pattern. That is, the four small blocks of the same color are settled as blocks to be cleared. Note that various conditions required to settle small blocks as objects to be cleared may be used. In this embodiment, when blocks of the same color form an n*m (n and m are integers equal to or larger than 2) rectangle (or sometimes an L shape or the like), it is determined that the first clear condition is satisfied. That is, the first clear condition is a condition required to settle blocks as objects to be cleared. When objects to be cleared are settled, a group of small blocks to be cleared is highlighted. The highlight may be made temporarily or continuously. In the latter case, the blocks to be cleared are highlighted from when they are settled until they are cleared.

As a characteristic feature of this embodiment, objects to be cleared are not immediately cleared even after they are settled. That is, the objects to be cleared are cleared only when the second clear condition is satisfied.

Figure 7:
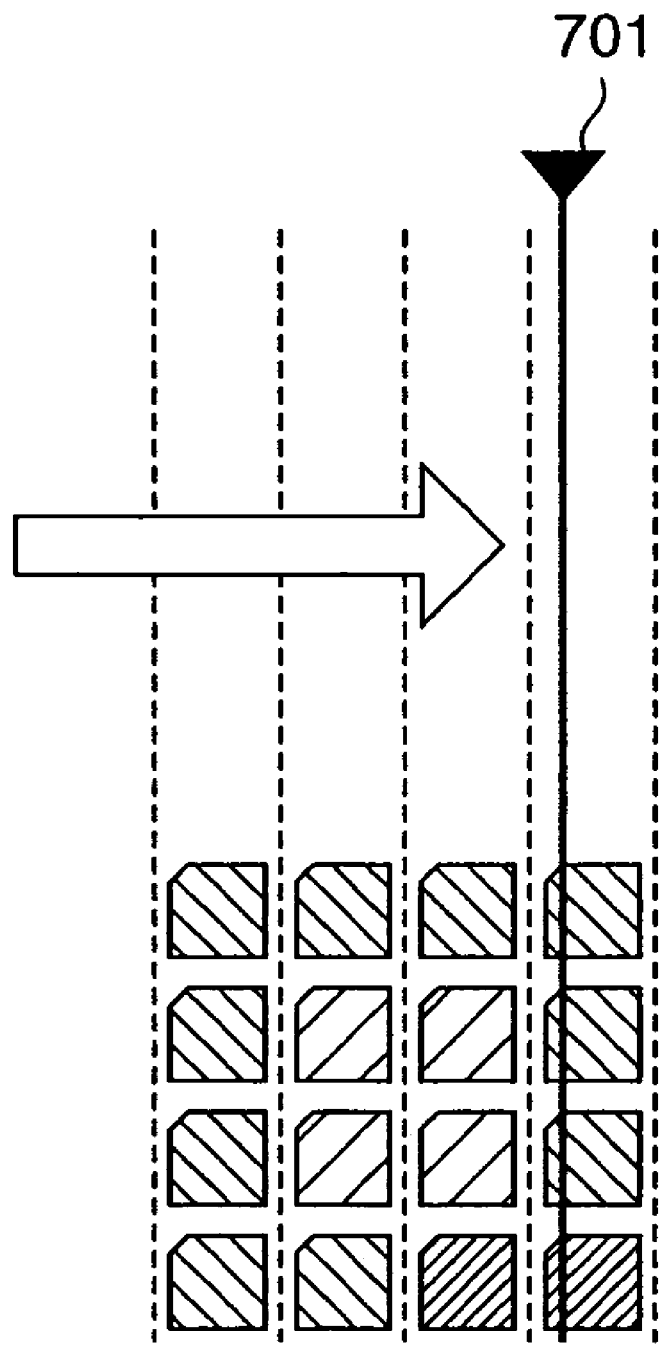
FIG. 7 shows a passage example of a sequence bar as a second clear condition according to the embodiment of the present invention.

FIG. 7 shows a passage example of a sequence bar as the second clear condition according to this embodiment. For example, a sequence bar 701 moves in synchronism with music data output from an audio output unit in progress of the game. For example, the sequence bar 701 moves from the left end to the right end, e.g., every two bars. Note that the sequence bar 701 may move from the bottom to the ceiling of the field 100. Also, these moving directions may be reversed. The present invention is not limited to the sequence bar as long as it need only passes the blocks to be cleared on the field 100.

Figure 8:
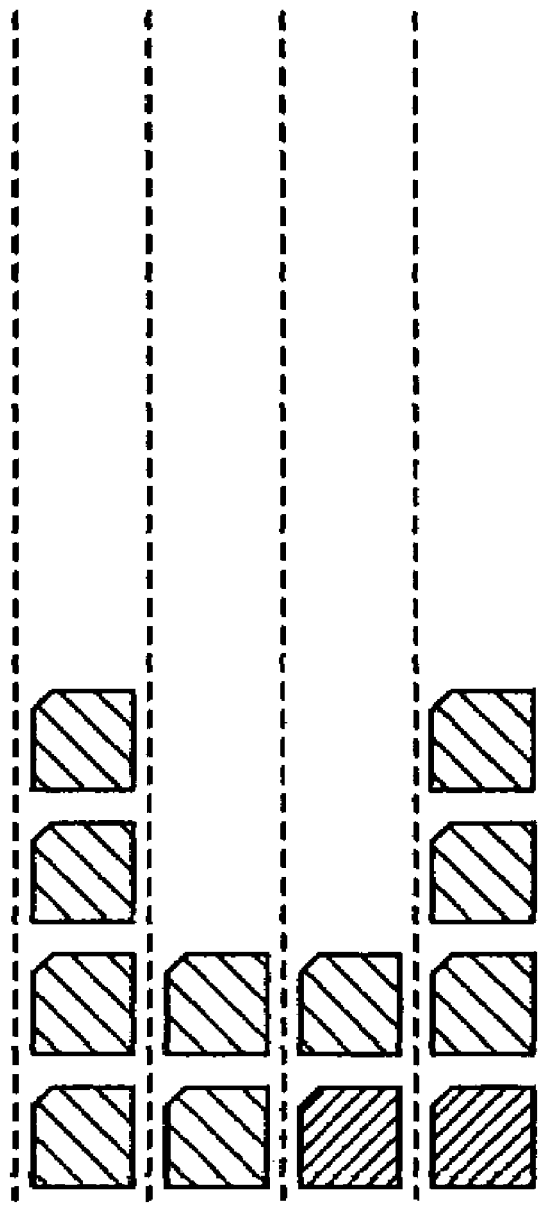
FIG. 8 shows a clear example of blocks to be cleared upon passage of the sequence bar according to the embodiment of the present invention.

FIG. 8 shows a clear example of the blocks to be cleared upon passage of the sequence bar according to this embodiment. When the sequence bar 701 has passed the blocks to be cleared, since the second clear condition is satisfied, the blocks to be cleared are cleared after the color of the blocks to be cleared is changed.

According to this embodiment, since blocks to be cleared are cleared after a plurality of clear conditions are satisfied, the game is more complicated, and can more entertain the player. Especially, even when blocks to be cleared can be settled by operating the falling object, they are not cleared immediately, and are cleared in wait for passage of the sequence bar that appears in synchronism with a music. Hence, the player can experience thrills, frustrations, feeling of tension, and exhilaration compared to the conventional games. While the player is waiting for passage of the sequence bar, since the game progresses and falling objects come down, the player can further enjoy these emotions.

According to FIG. 8, as a result of clearing blocks, four white blocks form a new group of blocks to be cleared at a lower left position. As can be seen from the flowcharts to be described later, a chain clear process is executed in this case. Note that the chain clear process is executed in wait for passage of the sequence bar 701.

Figure 9:
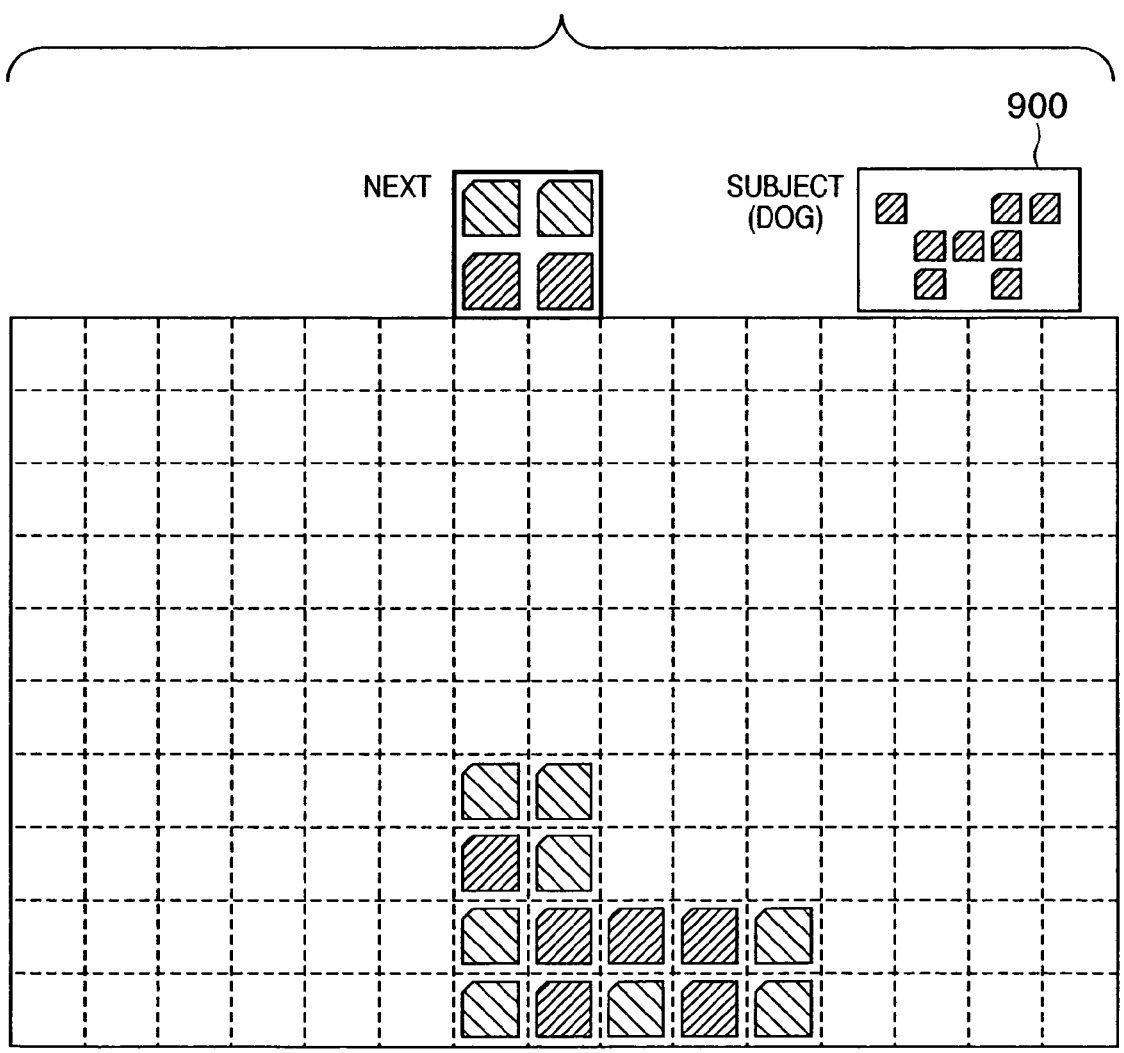
FIG. 9 shows another clear condition according to the embodiment of the present invention.

FIG. 9 shows another clear condition according to this embodiment. The conventional game makes it a clear condition that a plurality of blocks line up in one of the vertical, horizontal, and oblique directions. That is, it is nothing but a simple clear condition. By contrast, in this embodiment, when a pattern given as a subject can be formed, it is handled that the aforementioned first clear condition is satisfied. Note that the subject is a pattern, and the player may be puzzled unless a practical example is given. Hence, a subject box 900 used to display a subject is provided, and a pattern as a subject is displayed in that box.

Figure 10:
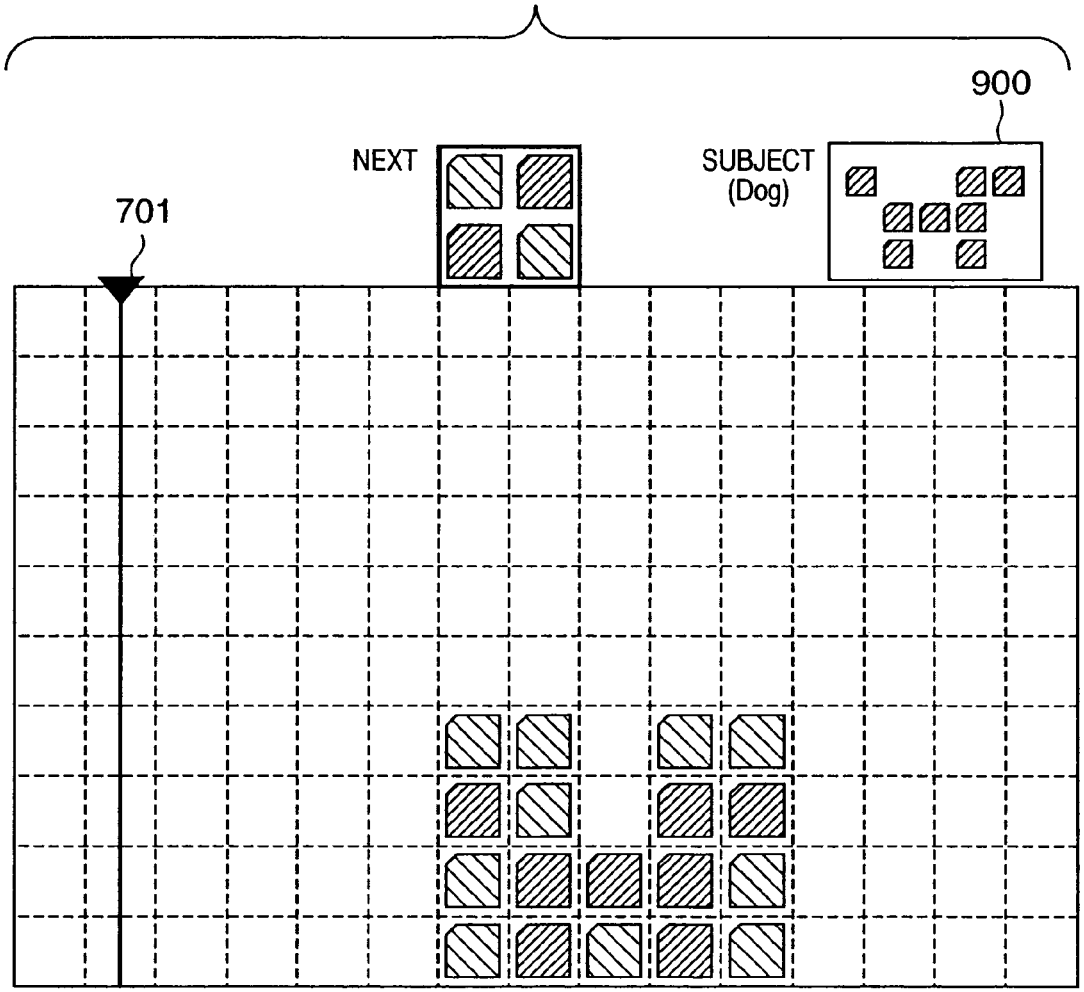
FIG. 10 shows a state wherein a subject of a pattern is achieved in the embodiment of the present invention.

FIG. 10 shows a state wherein the subject of the pattern is actually achieved. In this example, a pattern "dog" is given as a subject. After a while, when the sequence bar 701 passes, red blocks which form the pattern "dog" are cleared.

The subject (clear condition) of the pattern may or may not be changed in progress of the game. If the subject is changed, the game is more complicated, resulting in more fun.

When the subject of the pattern is achieved, bonus points may be added, blocks may be cleared without passage of the sequence bar, or all blocks in the field may be cleared, thus enhancing the tenacity of purpose to achievement of the pattern subject. Furthermore, the player can bliss due to achievement of the pattern.

Figure 11:
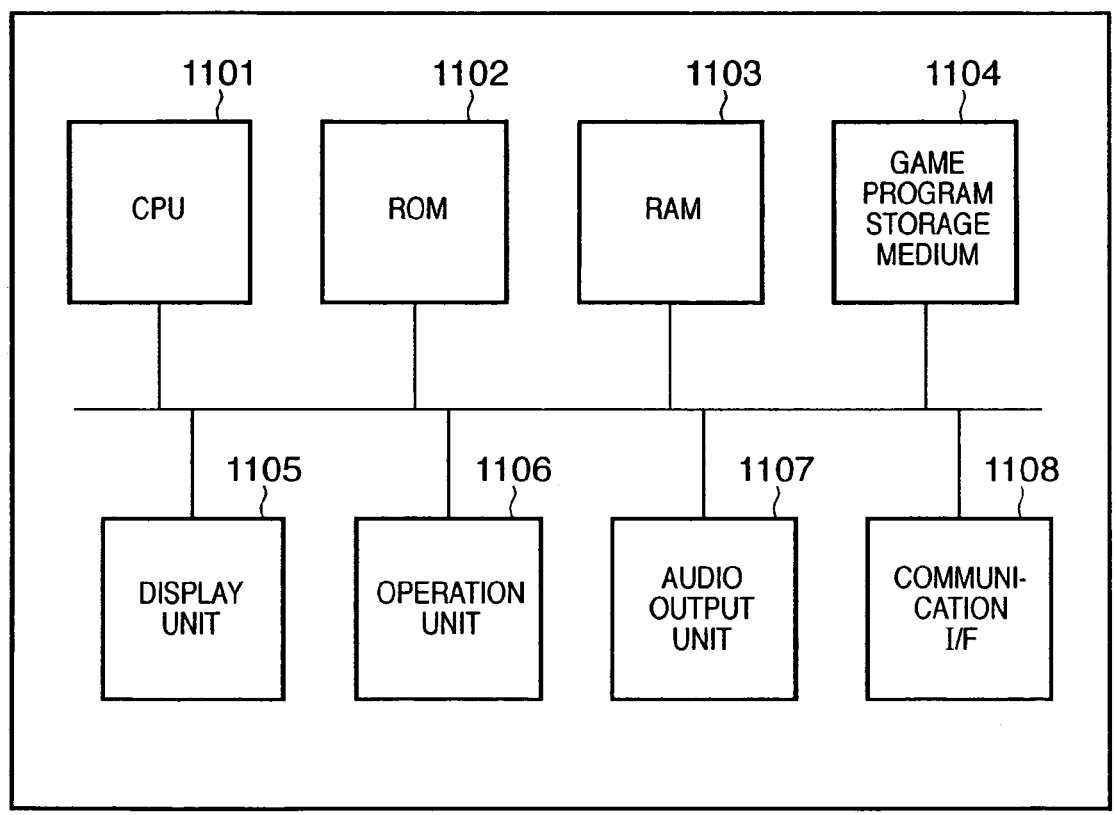
FIG. 11 is a block diagram showing an example of a game apparatus according to the embodiment of the present invention.

FIG. 11 is a block diagram showing an example of a game apparatus according to this embodiment. A CPU 1101 is a central processing unit which systematically controls the overall game apparatus. A ROM 1102 is a storage circuit for storing basic programs such as an OS and the like. A RAM 1103 is a storage circuit for storing data associated with the game. A game program storage medium 1104 is a storage medium such as a memory, CD ROM, DVD ROM, or the like, which stores a game program. A display unit 1105 is a liquid crystal display device or the like for displaying the contents of the game. An operation unit 1106 includes a plurality of buttons and keys, and outputs, to the CPU 1101, operation input signals used to move the falling object 102 in the lower, right, or left direction or to re arrange small blocks in the falling object 102. An audio output unit 1107 includes an audio output circuit and loudspeaker which are used to audibly output music data and effect sounds stored in the storage medium 1104. A communication interface 1108 is a communication circuit which connects an external PC or the like such as another game apparatus or the like and exchanges data.

Figure 12:
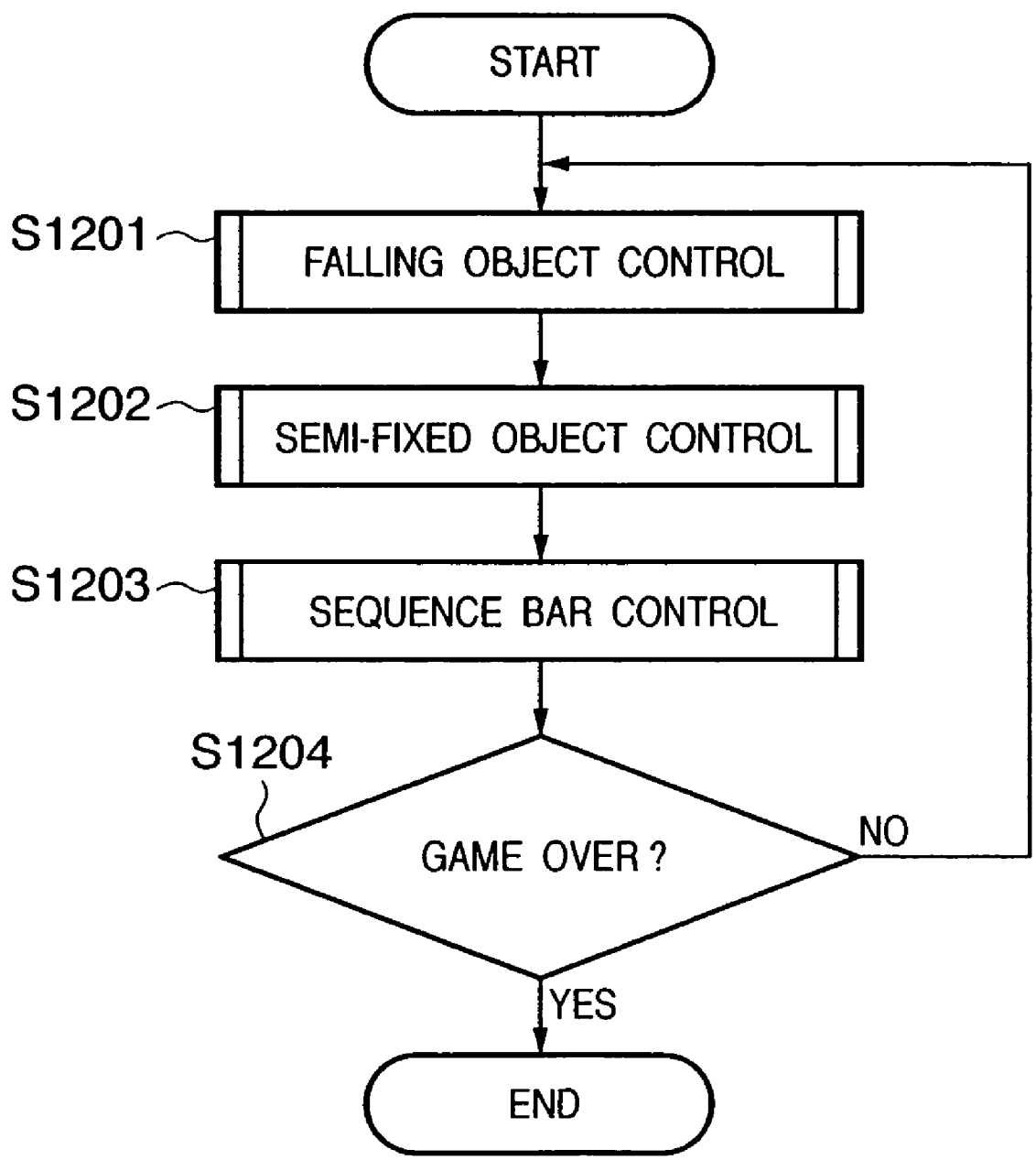
FIG. 12 is a flowchart showing an example of the main sequence of the game program according to the embodiment of the present invention.

FIG. 12 is a flowchart showing an example of the main sequence of the game program according to this embodiment.

In step S1201, the CPU 1101 controls the falling object 102. For example, the CPU 1101 determines four small blocks that form the falling object 102 by a random number, and displays the falling object 102 in the next box 101 as the falling start position. The CPU 1101 stores display position data of the falling object 102 on the field 100, and type data and display position data of the small blocks that form the falling object 102 in the RAM 1103. Note that flag data used to distinguish the falling object 102 and falling stop objects 103 may be stored in the RAM 1103 together.

In step S1202, the CPU 1101 controls the falling stop objects 103 on the field 100. For example, the CPU 1101 stores type data, display position data, and flag data indicating falling stop blocks of respective small blocks which form each falling stop block 103 in the RAM 1103. Note that data indicating whether or not a block exists and its type may be recorded on each grid on the field 100. A sequence (Field_Block[i, j], 0<i<n+1, 0<j<m+1) corresponding to the each grid is defined: if the value of the sequence is zero, it means the absence of a block; if it is 1, it means that a red block exists; and if it is 2, it means that a white block exists. In this case, i and j correspond to the display position data, and values substituted in the sequence correspond to data indicating the presence/absence and type of a block. If a grid which is located at the uppermost and leftmost position on the field 100 is represented by [1, 1], and a grid which is located at the lowermost and rightmost position is represented by [15, 10], if Field_Block[5, 9]=1, it can express that a red block exists in a grid at the fifth leftmost and ninth uppermost position.

Note that the falling stop blocks and falling block may be managed using this sequence. In this case, the value of the sequence may be defined: if it is zero, it means the absence of a block; if it is 1, it means that a falling stop red block exists; if it is 2, it means that a falling stop white block exists; if it is 3, it means that a falling red block exists; and if it is 4, it means that a falling white block exists.

In step S1203, the CPU 1101 controls movement and display of the sequence bar 701. The sequence bar 701 moves in synchronism with music data.

The CPU 1101 checks in step S1204 if the game is over. For example, if the falling stop objects are piled up in the vertical direction of the field 100 and there is no room for falling a new falling object 102, it is determined that the game is over. If the game is not over, the flow returns to step S1201.

Figure 13:
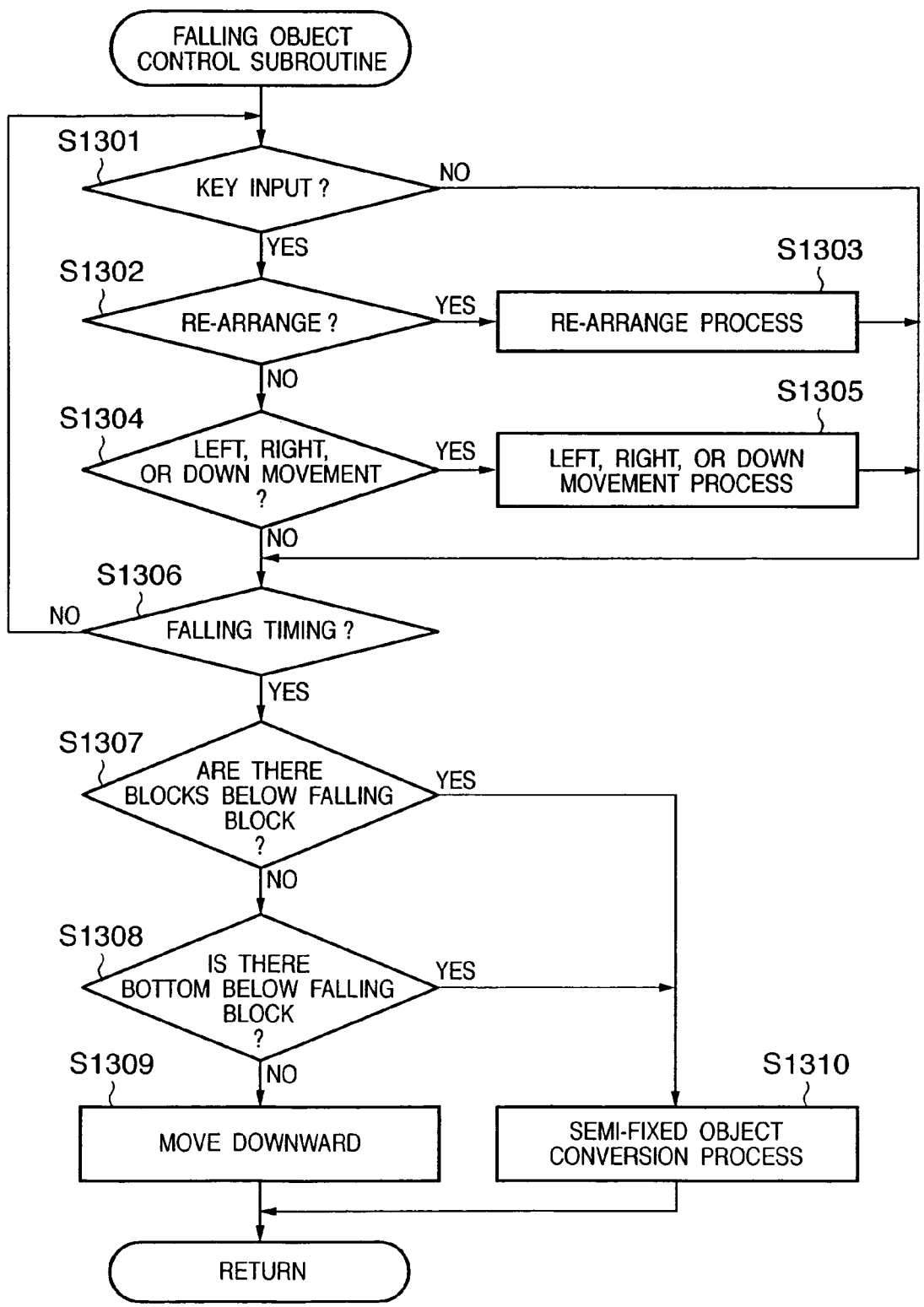
FIG. 13 is a flowchart showing an example of a falling object control subroutine according to the embodiment of the present invention.

FIG. 13 is a flowchart showing an example of a falling object control subroutine according to this embodiment. This subroutine corresponds to step S1201 described above.

The CPU 1101 checks in step S1301 if a key input from the operation unit 1106 is detected. If a key input is detected, the flow advances to step S1302; otherwise, the flow jumps to step S1306.

The CPU 1101 checks in step S1302 if the key input signal from the operation unit 1106 is an operation instruction that instructs to re arrange. If the key input signal is a re arrange instruction, the flow advances to step S1303; otherwise, the flow advances to step S1304.

In step S1303, the CPU 1101 re arranges the positions of small blocks which form the falling object 102. For example, the CPU 1101 reads out display data associated with the falling object 102 from the RAM 1103, changes display position data of respective small blocks in accordance with a predetermined re arrange rule, and stores the changed data in the RAM 1103 again. As the re arrange rule, various rules are available: for example, blocks are re arranged clockwise, blocks are re arranged counterclockwise, upper and lower blocks or right and left blocks are re arranged, and so forth. Any of these rules may be adopted.

The CPU 1101 checks in step S1304 if the key input signal from the operation unit 1106 is an operation instruction that instructs left, right, or down movement. If the key input signal is a move instruction, the flow advances to step S1305; otherwise, the flow advances to step S1306.

In step S1305, the CPU 1101 moves the falling object 102 in accordance with the move instruction. For example, the CPU 1101 reads out display data associated with the falling object 102 from the RAM 1103, changes display position data of respective small blocks in accordance with the move instruction, and stores the changed data in the RAM 1103 again. In case of right movement, the display position data of all the small blocks which form the falling object 102 are changed to indicate their right neighboring grids. In case of left or down movement, the display position data are changed by the same method.

The CPU 1101 checks in step S1306 if a falling timing is reached. For example, the CPU 1101 reads out time data from an internal timer, and checks if a predetermined time (1 sec or the like) is reached. If the falling timing is reached, the flow advances to step S1307; otherwise, the flow returns to step S1301.

The CPU 1101 checks in step S1307 if small blocks which form the falling stop block 103 exist below the falling object 102. That is, the CPU 1101 checks if a falling stop condition is satisfied. For example, the CPU 1101 reads out display position data of the falling object 102 (especially, those of the lower two small blocks of the four small blocks) from the RAM 1103, and calculates display position data one grid below the display position data of interest. The CPU 1101 then checks if the falling stop object 103 exists in grids corresponding to the calculated display position data. If no blocks of the falling stop object 103 exist below the falling object, the flow advances to step S1308; otherwise, the flow advances to step S1310.

The CPU 1101 checks in step S1308 if the bottom of the field 100 exists below the falling object 102. That is, the CPU 1101 checks if the falling stop condition is satisfied. For example, the CPU 1101 reads out display position data of the falling object 102 (especially, those of the lower two small blocks of the four small blocks) from the RAM 1103, and checks if that position is a move limit position (which can also be expressed as a falling stop position). In the field 100 of FIG. 1, if the coordinates of each grid are expressed by (x, y) and, especially, those of grids at the upper left corner and lower left corner are (1, 1) and (1, 10), the y coordinate of the move limit position is 10. Hence, if the y coordinate of the lower small blocks of the falling object 102 is 9 or less, it is determined that the bottom of the field 100 does not exist below the falling object. If the bottom of the field 100 exists below the falling object, the flow advances to step S1310; otherwise, the flow advances to step S1309.

In step S1309, the CPU 1101 moves the falling object 102 to a position one grid below, and displays it on the display unit 1105. For example, the CPU 1101 changes display position data of the four small blocks which form the falling object 102 to indicate positions one grid below, and stores the changed data in the RAM 103 again.

In step S1310, the CPU 1101 executes a falling stop object conversion process to the falling object 102. For example, the CPU 1101 changes flag data of respective small blocks included in the falling object 102 from those indicating a falling object to those indicating a falling stop object.

Figure 14:
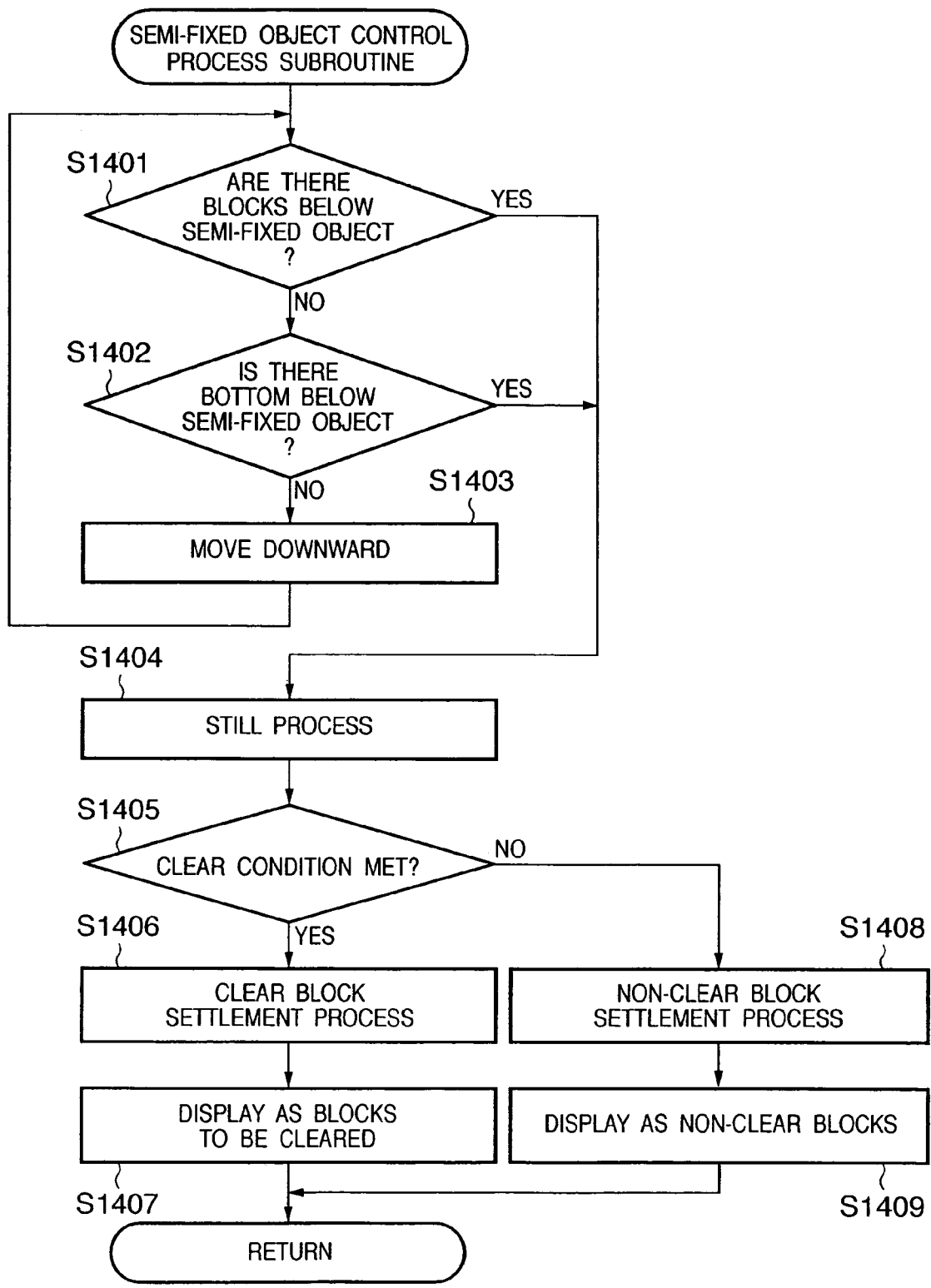
FIG. 14 is a flowchart showing an example of a semi fixed object control subroutine according to the embodiment of the present invention.

FIG. 14 is a flowchart showing an example of a falling stop object control subroutine according to this embodiment. This subroutine corresponds to step S1202 above. Note that steps S1401 to S1403 correspond to a process for arranging remaining blocks (non cleared blocks) after blocks to be cleared are cleared. That is, after some blocks of the falling stop objects 103 are cleared, since non cleared blocks carried on the cleared blocks must be moved downward, such arrange process is required.

The CPU 1101 checks in step S1401 if blocks exist below respective small blocks which form each falling stop block 103 in the field 100. If blocks exist below the falling stop block 103, the flow jumps to step S1404; otherwise, the flow advances to step S1402. Note that the detailed checking method is the same as that in step S1307.

The CPU 1101 checks in step S1402 if the bottom exists below respective small blocks. If the bottom exists below respective small blocks, the flow jumps to step S1404; otherwise, the flow advances to step S1403. Note that the detailed checking method is the same as that in step S1308.

In step S1403, the CPU 1101 moves the small blocks that form the falling stop object 103 downward. More specifically, the CPU 1101 executes the process explained in step S1309. After that, the flow returns to step S1401.

In step S1404, the CPU 1101 executes a still process for the falling stop object 103. For example, of small blocks included in the falling stop object 103, the CPU 1101 changes flag data and the like of small blocks which have reached a predetermined move stop position (e.g., they have reached the bottom or have landed on other blocks) so as to indicate that they stop moving and get still, and stores the changed data in the RAM 1103. In this way, the display unit 1105 displays non cleared blocks as if they were moved to the move stop position and are fixed in position.

The CPU 1101 checks in step S1405 if blocks which meet the clear condition exist. For example, the CPU 1101 checks if the falling stop objects 103 include a combination of small blocks that meet the clear condition. This process corresponds to the checking process associated with the first clear condition described above. This process will be described below using a practical example. The CPU 1101 reads out display position data and type data of each small block which forms the falling stop objects 103 from the RAM 1103, specifies its neighboring block on the basis of the display position data, and reads out type data of that block. The CPU 1101 then compares the readout type data of the neighboring block with that of the block of interest to check if the blocks have the same type. Furthermore, the CPU 1101 checks if a plurality of these blocks of the same type form an n*m (n and m are integers equal to or larger than 2) rectangle (or sometimes an L shape or the like). If a combination of small blocks that meet the clear condition is found, the flow advances to step S1406; otherwise, the flow advances to step S1408.

In step S1406, the CPU 1101 executes a settlement process of blocks to be cleared. For example, the CPU 1101 generates a clear object list that registers the coordinates of the blocks to be cleared in the field 100 on the basis of each display position data of small blocks which meet the first clear condition, and stores it in the RAM 1103. Alternatively, the CPU 1101 rewrites flag data of small blocks which meet the first clear condition from data indicating non cleared blocks to data indicating blocks to be cleared. These processes correspond to generation of data to be cleared.

In step S1407, the CPU 1101 highlights the blocks to be cleared. For example, the CPU 1101 executes flickering display, color change display, or the like on the coordinates registered in the clear object list so as to indicate blocks to be cleared.

In step S1408, the CPU 1101 executes a settlement process of non cleared blocks. That is, the CPU 1101 writes data indicating non cleared blocks in flag data of small blocks of the falling stop blocks 103, which do not meet the first clear condition, and stores the data in the RAM 1103.

In step S1409, the CPU 1101 displays non cleared blocks as usual. Displaying as usual is to display blocks to identify that they are not blocks to be cleared. For example, the CPU 1101 statically displays these blocks without highlighting them.

Figure 15:
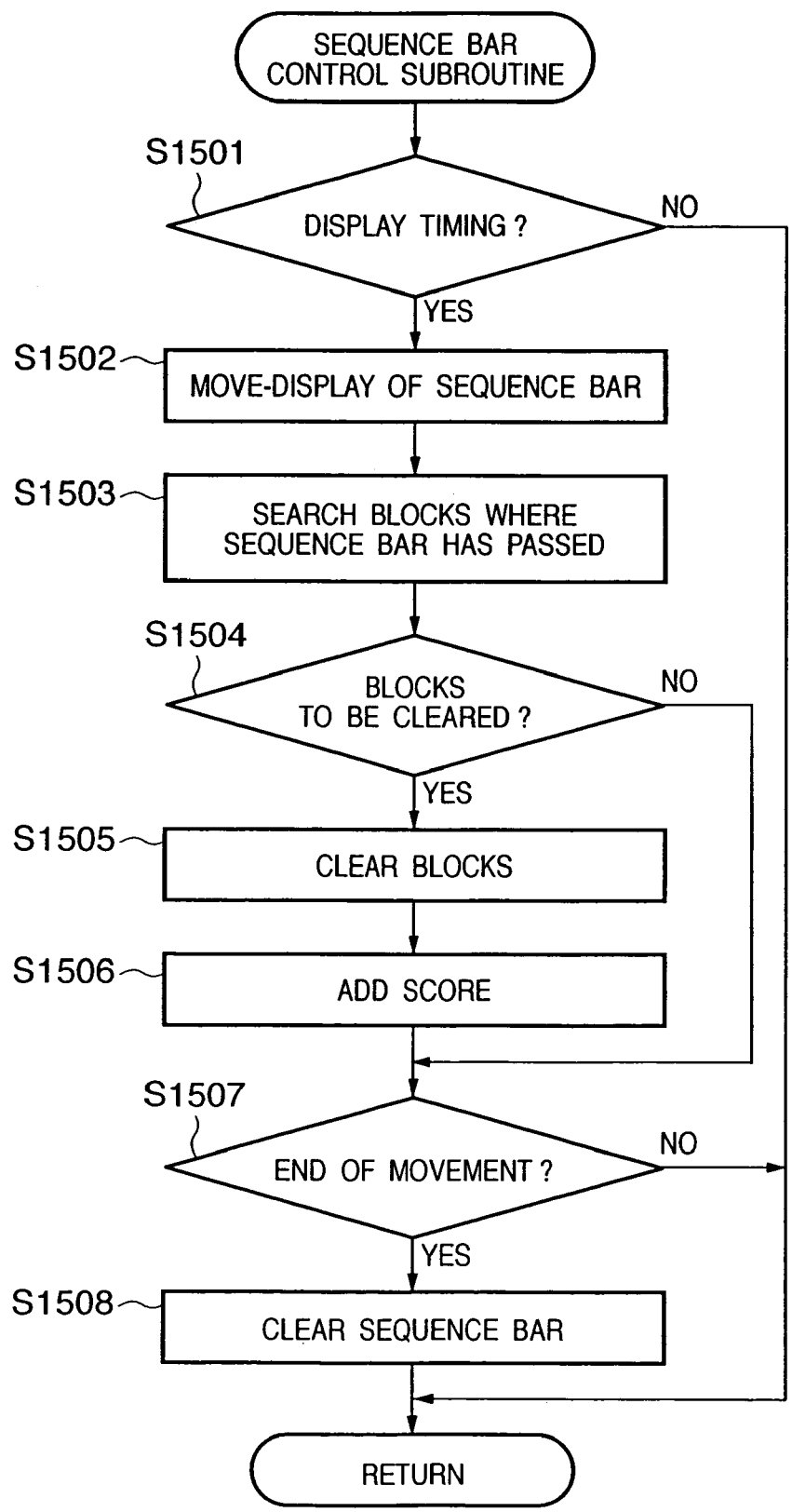
FIG. 15 is a flowchart showing an example of a sequence bar control subroutine according to the embodiment of the present invention.

FIG. 15 is a flowchart showing an example of a sequence bar control subroutine according to this embodiment. This subroutine corresponds to step S1203 above.

The CPU 1101 checks in step S1501 if the display timing of the sequence bar 701 is reached. The CPU 1101 reads out music data from the storage medium 1104 along with the progress of the game, and outputs it as sound via the audio output unit 1106. For example, the CPU 1101 displays the sequence bar 701 in synchronism with this music data. For example, the sequence bar 701 appears in accordance with tempo parameters included in the music data. Alternatively, the sequence bar 701 appears every time data for two bars of the music data are played. Note that the display timing of the sequence bar 701 may be controlled not directly based on the music data. For example, a counter counts given timings independently of the music data, and when the counter reaches a predetermined value, the CPU 1101 displays the sequence bar 701 to move it from the left to the right. Even in this case, since an audio output of the music data is executed, the sequence bar 701 consequently appears in synchronism with the output of the music data. In this way, if it is determined that the display timing of the sequence bar 701 is reached, the flow advances to step S1502; otherwise, the flow exits this subroutine.

In step S1502, the CPU 1101 displays the sequence bar 701 to move. For example, the CPU 1101 displays the sequence bar 701 at the left end of the field 100, and moves the displayed sequence bar 701 to the right. More specifically, the CPU 1101 rewrites the contents of the display position data of the sequence bar 701 every second from the position data indicating the left end of the field 100 to that indicating the right end. The position data is stored in the RAM 1103, and is read out and written by the CPU 1101 as needed.

In step S1503, the CPU 1101 searches for blocks where the sequence bar 701 has passed. For example, the CPU 1101 reads out the current display position data of the sequence bar 701 from the RAM 1103, and reads out those of blocks located on the left side of the sequence bar 701 on the basis of that display position data.

The CPU 1101 checks in step S1504 if blocks found by search are blocks to be cleared. For example, the CPU 1101 checks whether or not the readout flag data of each block indicates a block to be cleared. Note that the CPU 1101 may read out the aforementioned clear object list from the RAM 1103, and compare the coordinates registered in the list with the display position of the sequence bar 701 to check if clear blocks are located on the left side of the sequence bar 701. In this way, the CPU 1101 checks in steps S1503 and S1504 if the sequence bar 701 has passed the blocks to be cleared. If the sequence bar 701 has passed the blocks to be cleared, the flow advances to step S1505; otherwise, the flow jumps to step S1507.

In step S1505, the CPU 1101 clears display of the blocks to be cleared after the sequence bar 701 has passed.

In step S1506, the CPU 1101 adds a score in correspondence with the number of cleared blocks, and stores the score data in the RAM 1103.

The CPU 1101 checks in step S1507 if the movement of the sequence bar 701 is to be stopped. For example, the CPU 1101 reads out the display position data of the sequence bar 701 from the RAM 1103, and determines that the movement is to be stopped if the display position data indicates the coordinates of the right end of the field 100. If the movement is to be stopped, the flow advances to step S1508; otherwise, this subroutine ends.

In step S1508, the CPU 1101 clears display of the sequence bar 701, and this subroutine ends.

As described above, according to this embodiment, in a game which makes the player operate a falling object (ex.: falling object 102) which is falling in a predetermined display area (ex.: field 100) and clears the falling object and falling stop objects by combining the falling object and falling stop objects 103 under a predetermined condition, it is checked if a new falling stop object which stops falling (ex.: any blocks included in the falling stop object 103 which has been just turned from the falling object 102) and other falling stop objects arranged in advance around that falling stop object (ex.: any blocks included in the falling stop objects 103 originally piled up from the bottom of the field 100) satisfy a predetermined clear condition (ex.: S1405). If this clear condition is satisfied (i.e., blocks to be cleared are settled), a portion that satisfies the clear condition of the falling stop objects (ex.: a group of blocks which satisfy the clear condition of those included in the falling stop blocks 103) is registered as an object to be cleared. When a sequence bar (ex.: sequence bar 701) which moves vertically or horizontally in the display area in synchronism with a music output along with the progress of the game has passed the portion (ex.: blocks to be cleared) of the falling stop objects, that portion is cleared (ex.: S1503 to S1505).

According to this embodiment, since objects are not immediately cleared even when the clear condition is satisfied but are cleared in wait for passage of the sequence bar 701, the player can be thrilled more than the conventional games. In the description of the above embodiment, when the sequence bar which is displayed in synchronism with a music output along with the progress of the game has passed a given portion of the falling stop objects, that portion is cleared. However, display or the like of the sequence bar may be omitted, and falling stop blocks registered as objects to be cleared may be cleared in synchronism with the output of a predetermined part of a music which is output along with the progress of the game. Of course, the sequence bar may be displayed at a predetermined timing asynchronous with the music data, and when the sequence bar has passed the falling stop blocks registered as objects to be cleared, these falling stop blocks may be cleared.

In the above embodiment, the condition for settling blocks to be cleared, and the condition for determining a timing of actually clearing blocks to be cleared (e.g., passage of the sequence bar) are used. In the broader sense, the former may be called a first clear condition, and the latter may be called a second clear condition.

It is often difficult to arouse player's strong interest by only a simple clear condition, i.e., when a predetermined number or more of small blocks that form falling stop objects run on vertically, horizontally, or obliquely.

Hence, as has been explained using FIGS. 9 and 10, when, for example, a predetermined pattern such as "dog", "X mark", or the like is formed by a plurality of blocks included in the falling stop objects as a clear condition, these blocks may be cleared. Note that "dog" or "X mark" is merely an example, and various other patterns may be adopted.

When formation of a predetermined pattern is used as a clear condition, a hint of the pattern may be displayed. No game that adopts formation of a predetermined pattern as a clear condition is available at least in the field of "falling block games". For this reason, the player may be puzzled by understanding of the clear condition until he or she gets used to the game. Hence, if a hint of the pattern is displayed on the game window, understanding of the game by the player can be deepened, and the time required for the player to get used to the game can be shortened.

Figure 16:
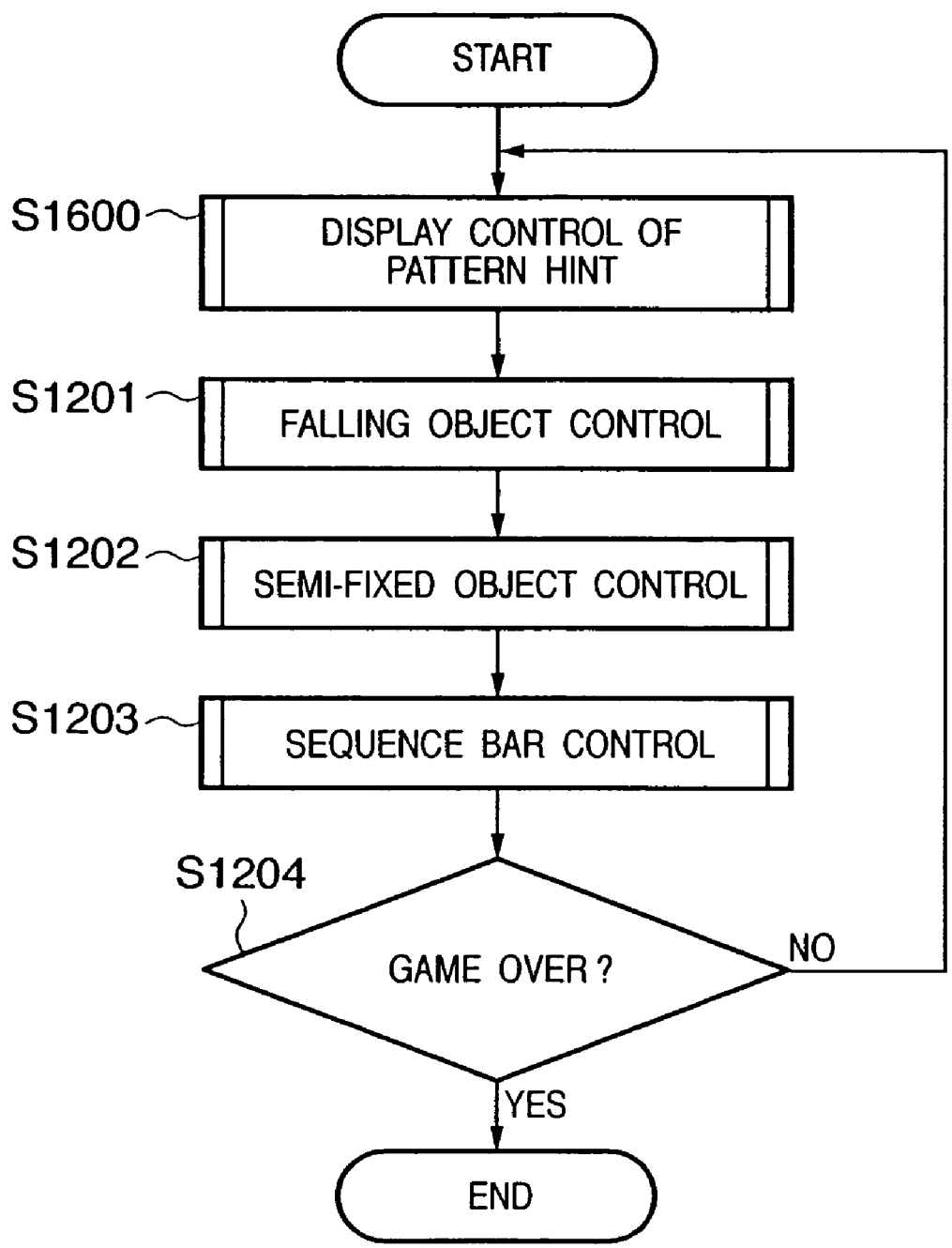
FIG. 16 is a flowchart showing an example of another main routine according to the embodiment of the present invention.

FIG. 16 is a flowchart showing an example of another main routine according to this embodiment. A simple description of the already explained steps will be given by denoting them by the same step numbers.

In step S1600, the CPU 1101 displays a hint of a pattern as one clear condition on the subject box 900. As shown in FIG. 9, a pattern "dog" is displayed as a hint of the pattern on the upper right side of the field 100. After that, step S1201 and subsequent steps are executed, as described above.

Figure 17:
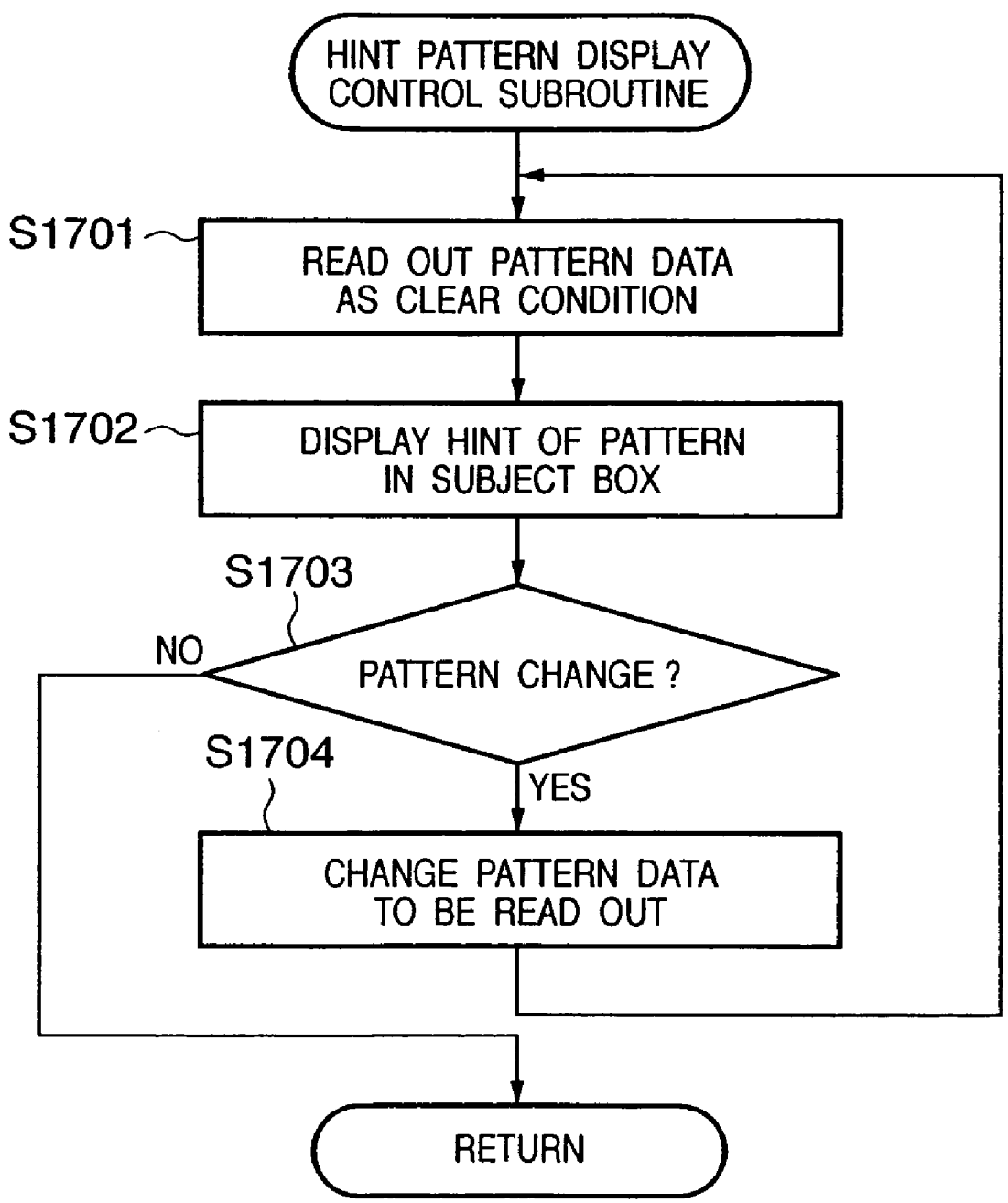
FIG. 17 is a flowchart showing an example of a pattern hint display control subroutine according to the embodiment of the present invention.

FIG. 17 is a flowchart showing an example of a pattern hint display control subroutine according to this embodiment. This subroutine corresponds to step S1600 above. Note that both steps S1703 and S1704 are options and are not always required.

In step S1701, the CPU 1101 reads out pattern data as one clear condition from the RAM 1103 or storage medium 1104. In this case, the CPU 1101 may read out a plurality of pattern data and may set them as clear conditions.

In step S1702, the CPU 1101 displays a hint such as the readout pattern data or the like on the subject box. Note that the CPU 1101 may read out and display hint data in place of the pattern data. The hint data means information suggestive of the pattern, and similarly provides a hint of the pattern as in the pattern data.

The CPU 1101 checks in step S1703 if the change timing of the pattern data is reached. The change timing may be set when the player clears the subject and the next subject is required or when a periodic timing or random timing is reached.

For example, upon checking the clear condition in step S1405 above, the CPU 1101 reads out the pattern data from the RAM 1103 or the like, and checks if a layout of a plurality of blocks which matches that of a plurality of blocks defined by the pattern data is formed by the falling stop objects 103. When the falling stop objects 103 include a layout of blocks corresponding to the pattern data, the CPU 1101 registers the group of these blocks as blocks to be cleared, and stores data indicating achievement of the subject in the RAM 1103. Then, in step S1703 the CPU 1101 determines that the change timing of the pattern is reached when it reads out the data indicating achievement of the subject from the RAM 1103, and the flow advances to step S1704. Otherwise, the control exits this subroutine.

In step S1704, the CPU 1101 changes pattern data to be read out. For example, when a plurality of pattern data are stored in the storage medium 1104, at least one of them is loaded onto the RAM 1103. The flow then returns to step S1701, and the CPU 1101 reads out the changed pattern data from the RAM 1103.

FIGS. 9 and 10 show an actual display example associated with the aforementioned process using the pattern data.

If blocks are cleared when a predetermined pattern such as "dog", "X mark", or the like is formed, since elaborate clear conditions can be set compared to the conventional games, the player can experience the difficulty level and exhilaration of the game unlike in the conventional games.

Since a hint of the pattern is displayed, it can help the player understand the clear condition. Note that display of the hint is not always necessary.

Note that a plurality of pattern data may be used as clear conditions. In this case, in step S1702, the CPU 1101 may periodically and selectively display hints associated with the plurality of pattern data. If a plurality of hints can be displayed simultaneously, the need for such switching of hint display can be obviated.

If the subject of the pattern is achieved, the game may be controlled irregularly. For example, the CPU 1101 may add bonus points to the score, may clear blocks to be cleared before the sequence bar 701 passes, or may clear all blocks in the field, thus enhancing the tenacity of purpose to achievement of the pattern subject. Furthermore, the player can bliss due to achievement of the pattern.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-159811 filed on May 28, 2004, which is hereby incorporated by reference herein.

What is claimed is:

1. A computer system comprising:
   a processor;
   an operation unit that makes an operation input to a game, by which a player controls a falling object that falls within a predetermined display area, and clears the falling object and falling stop objects by combining the falling object and the falling stop objects under a predetermined condition,
   a display unit which displays information associated with the game,
   a computer-readable storage unit which stores data required to execute the game and program instructions, and
   an audio output unit which outputs music along with progress of the game based on the stored data,
   wherein execution of the program instructions by the processor controls the computer system to:

display the falling object at a falling start position by setting display position data of the falling object at the falling start position in the predetermined display area of the display unit;

change the display position data of the falling object to move the falling object displayed on the display unit in a lower direction of the display area independently of an operation input from the operation unit;

change the display position data of the falling object to move the falling object in the lower or horizontal direction of the display area in accordance with an operation input from the operation unit to the falling object;

stop, when the falling object reaches a falling stop position of the display area and satisfies a falling stop condition, falling of the falling object, and displaying the falling object as a falling stop object;

determine if the display position data of the falling stop object and display position data of other falling stop objects which are arranged around the falling stop object in advance satisfy clear conditions;

generate, when the clear conditions are satisfied, clear object data used to register a portion of the falling stop object which satisfies the clear conditions as an object to be cleared, and storing the generated data in the storage unit;

highlight the registered portion of the falling stop which satisfies the clear conditions;

display a sequence bar which moves in the display area in a direction which is different from the lower direction in synchronism with the music data which is read out from the storage unit and is output from the audio output unit along with progress of the game;

determine, on the basis of display position data of the sequence bar, if the sequence bar has moved past the portion of the falling stop object corresponding to the clear object data stored in the storage unit; and clear, when it is determined that the sequence bar has moved past the highlighted portion of the falling stop object corresponding to the stored clear object data, the display of the highlighted portion corresponding to said stored clear object data while maintaining the display of other portions of the falling stop object that have not been determined to satisfy the clear conditions.

2. The computer system according to claim 1, wherein:
the falling object is formed of at least one small block, and
at least one of the clear conditions is to form a predetermined pattern by the at least one small block and small blocks included in the falling stop objects.

3. The computer system according to claim 2, wherein the program instructions control the computer system to:
read out display data of the pattern as the clear condition from the storage unit, and
display the pattern on the display unit.

4. The computer system according to claim 3, wherein the program instructions control the computer system to:
read out, when the pattern displayed on the display unit is formed by the falling stop objects, display data associated with a next pattern from the storage unit, and
display the next pattern on the display unit.

5. A game apparatus having a processor and a computer-readable recording medium having program instructions recorded thereon, wherein execution of the program instructions by the processor cause the game apparatus to provide a game in which a player operates a operation input unit to control a falling object that falls within a predetermined display area of a display unit to clear the falling object and falling stop objects by combining the falling object and the falling stop objects under a predetermined condition, the apparatus comprising:

means for displaying a falling object at a falling start position of a predetermined display area;

means for displaying the displayed falling object to move in a lower direction of the display area independently of an operation input from the player;

means for displaying the falling object to move in the lower or horizontal direction of the display area in accordance with an operation input to the falling object;

means for, when the falling object reaches a falling stop position of the display area and satisfies a falling stop condition, stopping falling of the falling object, and displaying the falling object as a falling stop object;

means for determining if the falling stop object and other falling stop objects which are arranged around the falling stop object in advance satisfy clear conditions;

means for, when the clear conditions are satisfied, registering a portion of the falling stop object which satisfies the clear conditions as an object to be cleared;

means for highlighting the registered portion of the falling stop object which satisfies the clear conditions;

means for displaying a sequence bar which moves in a direction which is different from the lower direction in the display area in synchronism with a music which is output along with progress of a game; and means for, when the sequence bar has passed the portion of the falling stop object registered as the object to be cleared, clearing the highlighted portion of the falling stop object while maintaining the display of other portions of the falling stop object that have not been determined to satisfy the clear conditions.

6. The apparatus according to claim 5, wherein:
the falling object is formed of at least one small block, and at least one of the clear conditions is to form a predetermined pattern by the at least one small block and small blocks included in the falling stop objects.

7. The apparatus according to claim 6, further comprising means for reading out display data of the pattern as the clear condition, and displaying the pattern on the display unit.

8. The apparatus according to claim 7, further comprising means for, when the displayed pattern is formed by the falling stop objects, reading out and displaying display data associated with a next pattern.

9. A method of controlling a game apparatus having:
a processor,
an operation unit that receives an operation input from a player to a game,
a display unit which displays information associated with the game,
a computer-readable storage unit which stores data required to execute the game and program instructions, and
an audio output unit which outputs music along with progress of the game based on the stored data,
wherein the program instructions, when executed by the processor, control the game apparatus to perform the game in which the player uses the operation unit to control a falling object that falls within a predetermined display area of the display unit, and clears the falling object and falling stop objects by combining the falling object and the falling stop objects under a predetermined condition,
the method comprising:
a step of displaying on the display unit the falling object at a falling start position by setting by the processor display position data of the falling object at the falling start position in the predetermined display area of the display unit;

a step of changing by the processor the display position data of the falling object to move the falling object displayed on the display unit in a lower direction of the display area independently of an operation input from the operation unit;

a step of changing by the processor the display position data of the falling object to move the falling object in the lower or horizontal direction of the display area of the display unit in accordance with an operation input from the operation unit to the falling object;

a step of stopping by the processor, when the falling object reaches a falling stop position of the display area and satisfies a falling stop condition, falling of the falling object, and displaying on the display unit the falling object as a falling stop object;

a step of determining by the processor if the display position data of the falling stop object and display position data of other falling stop objects which are arranged around the falling stop object in advance satisfy clear conditions;

a step of generating by the processor, when the clear conditions are satisfied, clear object data used to register a portion of the falling stop object which satisfies the clear conditions as an object to be cleared, and storing the generated data in the storage unit;

a step of highlighting on the display unit the registered portion of the falling stop which satisfies the clear conditions;

a step of displaying on the display unit a sequence bar which moves in the display area in a direction which is different from the lower direction in synchronism with the music data which is read out from the storage unit and is output from the audio output unit along with progress of the game;

a step of determining by the processor, on the basis of display position data of the sequence bar, if the sequence bar has moved past the portion of the falling stop object corresponding to the clear object data stored in the storage unit; and a step of clearing from the display unit, when it is determined that the sequence bar has moved past the highlighted portion of the falling stop object corresponding to the clear object data stored in the storage unit, the display of the highlighted portion corresponding to the stored clear object data while maintaining the display of other portions of the falling stop object that have not been determined to satisfy the clear conditions.

10. The method according to claim 9, wherein:
the falling object is formed of at least one small block, and at least one of the clear conditions is to form a predetermined pattern by the at least one small block and small blocks included in the falling stop objects.

11. The method according to claim 10, further comprising a step of reading out display data of the pattern as the clear condition from the storage unit, and displaying the pattern on the display unit.

12. The method according to claim 11, further comprising a step of reading out, when the pattern displayed on the display unit is formed by the falling stop objects, display data associated with a next pattern from the storage unit, and displaying the next pattern on the display unit.

13. A game apparatus having a processor and a computer-readable recording medium having program instructions recorded thereon, wherein said program instructions, when executed by the processor, control the game apparatus to provide a game of clearing a falling object which falls in a predetermined display area of a display unit, and falling objects, which have already fallen to a falling stop position, in a predetermined combination, the apparatus comprising:

control means for operating the falling object in accordance with a player's operation input;

display means for displaying the falling object and a moving object, which is movable in the predetermined display area along with progress of a game, in the predetermined display area, wherein directions of the falling object and the moving object are different from each other;

determination means for determining if the falling object and falling objects that have fallen to the falling stop position satisfy the predetermined combination;

registration means for registering the falling objects, which is determined by said determination means to satisfy the predetermined combination, of the falling object and the falling objects that have fallen to the falling stop position;

highlighting means for highlighting the registered falling objects that have been determined to satisfy the predetermined combination; and clearing means for clearing the highlighted falling objects registered by said registration means when the moving object moves on the falling objects registered by said registration means while maintaining the display of other portions of the falling stop object that have not been determined to satisfy the predetermined combination.

14. The apparatus according to claim 13, further comprising:
storage means for storing music data; and
audio output means for audibly outputting the music data, wherein the moving object is movable in the predetermined display area in synchronism with the music data output from said audio output means.

15. A game apparatus having a processor and a computer-readable recording medium having program instructions recorded thereon, wherein said program instructions, when executed by the processor, control the game apparatus to provide a game of clearing a falling object which falls in a predetermined display area of a display unit, and falling objects, which have already fallen to a falling stop position, in a predetermined combination, said game apparatus comprising:

operation means for operating the falling object in accordance with a player's operation input;

display means for displaying the falling object in the predetermined display area, the falling object falling in a first direction;

determination means for determining if the falling object and falling objects that have fallen to the falling stop position satisfy the predetermined combination;

registration means for registering the falling objects, which is determined by said determination means to satisfy the predetermined combination, of the falling object and the falling objects that have fallen to the falling stop position;

highlighting means for highlighting the registered falling objects that have been determined to satisfy the predetermined combination;

storage means for storing music data output along with the progress of the game;

audio output means for audibly outputting the music data;

clearing means for, when a predetermined part of the music data is output from said audio output means, clearing the highlighted falling objects registered by said registration means while maintaining the display of other portions of the falling stop object that have not been determined to satisfy the predetermined combination.

16. A computer-readable recording medium having computer program recorded thereon that, when executed by a processor, causes a computer to perform a game in which a player uses an operation input device to control a falling object that falls within a predetermined display area of a display device, and clears the falling object and falling stop objects by combining the falling object and the falling stop objects under a predetermined condition, said computer program causing the computer to execute operations comprising:

displaying a falling object at a falling start position by setting display position data of the falling object at the falling start position in the predetermined display area of the display device;

changing the display position data of the falling object to move the falling object displayed on the display device in a lower direction of the display area independently of an operation input from an operation input device;

changing the display position data of the falling object to move the falling object in the lower or horizontal direction of the display area in accordance with an operation input from the operation input device to the falling object;

stopping, when the falling object reaches a falling stop position of the display area and satisfies a falling stop condition, falling of the falling object, and displaying the falling object as a falling stop object;

determining if the display position data of the falling stop object and display position data of other falling stop objects which are arranged around the falling stop object in advance satisfy clear conditions;

generating, when the clear conditions are satisfied, clear object data used to register a portion of the falling stop object which satisfies the clear conditions as an object to be cleared, and storing the generated data in a computer-readable storage device;

displaying highlighting of the registered portion of the falling stop which satisfies the clear conditions;

displaying a sequence bar which moves in the display area in a direction which is different from the lower direction in synchronism with the music data which is read out from the computer-readable storage device and is output from an audio output device along with progress of the game;

determining, on the basis of display position data of the sequence bar, if the sequence bar has moved past the portion of the falling stop object corresponding to the clear object data stored in the computer-readable storage device; and clearing, when it is determined that the sequence bar has moved past the highlighted portion of the falling stop object corresponding to the stored clear object data, the display of the highlighted portion corresponding to said stored clear object data while maintaining the display of other portions of the falling stop object that have not been determined to satisfy the clear conditions.

* * * * *